United States Patent
Wu (10) Patent No.: US 8,815,102 B2
(45) Date of Patent: Aug. 26, 2014

(54) METHOD FOR FABRICATING PATTERNED DICHROIC FILM

(75) Inventor: Yi-Tyng Wu, Chiayi (TW)

(73) Assignee: United Microelectronics Corporation, Hsinchu (TW)

( * ) Notice: Subject to any disclaimer, the term of this patent is extended or adjusted under 35 U.S.C. 154(b) by 134 days.

(21) Appl. No.: 13/427,985

(22) Filed: Mar. 23, 2012

(65) Prior Publication Data

US 2013/0248484 A1    Sep. 26, 2013

(51) Int. Cl.
    *C30B 33/00*    (2006.01)

(52) U.S. Cl.
    USPC ...... 216/23; 216/37; 216/24; 430/7; 430/323; 430/324

(58) Field of Classification Search
    USPC ................ 216/23, 24, 37; 257/347, E29.139; 430/7, 323, 324
    See application file for complete search history.

(56) References Cited

U.S. PATENT DOCUMENTS

| | | |
|---|---|---|
| 3,930,295 A | 1/1976 | Rose |
| 4,148,048 A | 4/1979 | Takemoto |
| 4,460,912 A | 7/1984 | Takeshita |
| 4,533,624 A | 8/1985 | Sheppard |
| 4,644,172 A | 2/1987 | Sandland |
| 4,745,451 A | 5/1988 | Webb |
| 4,951,104 A | 8/1990 | Kato |
| 5,070,380 A | 12/1991 | Erhardt |
| 5,120,622 A | 6/1992 | Hanrahan |
| 5,241,417 A | 8/1993 | Sekiguchi |
| 5,246,803 A | 9/1993 | Hanrahan |
| 5,294,288 A | 3/1994 | Melpolder |
| 5,321,297 A | 6/1994 | Enomoto |
| 5,466,926 A | 11/1995 | Sasano |
| 5,587,696 A | 12/1996 | Su |
| 5,625,210 A | 4/1997 | Lee |
| 5,650,864 A | 7/1997 | Tseng |
| 5,830,624 A | 11/1998 | Bae |
| 5,880,495 A | 3/1999 | Chen |
| 5,977,535 A | 11/1999 | Rostoker |
| 6,006,764 A | 12/1999 | Chu |
| 6,071,826 A | 6/2000 | Cho |
| 6,081,018 A | 6/2000 | Nakashiba |
| 6,087,211 A | 7/2000 | Kalnitsky |
| 6,124,200 A | 9/2000 | Wang |
| 6,294,313 B1 | 9/2001 | Kobayashi |
| 6,297,160 B1 | 10/2001 | Chien |
| 6,338,976 B1 | 1/2002 | Huang |
| 6,352,876 B1 | 3/2002 | Bordogna |
| 6,369,417 B1 | 4/2002 | Lee |
| 6,376,797 B1 | 4/2002 | Piwczyk |
| 6,388,278 B1 | 5/2002 | Suzuki |
| 6,407,415 B2 | 6/2002 | Lee |
| 6,433,844 B2 | 8/2002 | Li |
| 6,482,669 B1 | 11/2002 | Fan |
| 6,514,810 B1 | 2/2003 | Kim |
| 6,566,151 B2 | 5/2003 | Yeh |

(Continued)

*Primary Examiner* — Nadine Norton
*Assistant Examiner* — Maki Angadi
(74) *Attorney, Agent, or Firm* — WPAT, PC; Justin King (57) ABSTRACT

A method for fabricating a patterned dichroic film is provided, wherein the method comprises steps as follows: A patterned material layer comprising at least one inorganic layer is firstly provided on a substrate. A film deposition process is then performed to form a dichroic film on the patterned material layer and the substrate. The patterned material layer is subsequently removed, whereby a portion of the dichroic film disposed on the patterned material layer can be removed simultaneously.

15 Claims, 6 Drawing Sheets

(56) References Cited

U.S. PATENT DOCUMENTS

| | | |
|---|---|---|
| 6,617,189 B1 | 9/2003 | Chen |
| 6,632,700 B1 | 10/2003 | Fan |
| 6,641,464 B1 | 11/2003 | Steere, III |
| 6,664,191 B1 | 12/2003 | Kim |
| 6,730,555 B2 | 5/2004 | Kim |
| 6,794,215 B2 | 9/2004 | Park |
| 6,821,809 B2 | 11/2004 | Abe |
| 6,841,848 B2 | 1/2005 | MacNamara |
| 6,846,722 B2 | 1/2005 | Lee |
| 6,849,533 B2 | 2/2005 | Chang |
| 6,872,584 B2 | 3/2005 | Nakashiba |
| 6,921,934 B2 | 7/2005 | Patrick |
| 6,933,972 B2 | 8/2005 | Suzuki |
| 6,953,608 B2 | 10/2005 | Leu |
| 6,960,512 B2 | 11/2005 | Cheng |
| 7,006,294 B2 | 2/2006 | Steenblik |
| 7,078,779 B2 | 7/2006 | Wang |
| 7,115,924 B1 | 10/2006 | LaMaster |
| 7,129,172 B2 | 10/2006 | Morrow |
| 7,180,044 B2 | 2/2007 | Yu |
| 7,199,439 B2 | 4/2007 | Farnworth |
| 7,229,745 B2 | 6/2007 | Lamarre |
| 7,315,359 B2 | 1/2008 | Hong |
| 7,328,915 B2 | 2/2008 | Smith |
| 7,384,843 B2 * | 6/2008 | Kim et al. ............ 438/257 |
| 7,432,026 B2 * | 10/2008 | Wu et al. .............. 430/7 |
| 7,498,190 B2 | 3/2009 | Kao |
| 7,524,690 B2 * | 4/2009 | Ko et al. ............ 438/31 |
| 7,648,851 B2 | 1/2010 | Fu |
| 2001/0023086 A1 | 9/2001 | Park |
| 2004/0122328 A1 | 6/2004 | Wang |
| 2005/0024520 A1 | 2/2005 | Yamamoto |
| 2005/0103983 A1 | 5/2005 | Yamaguchi |
| 2005/0121599 A1 | 6/2005 | Mouli |
| 2005/0186739 A1 | 8/2005 | Wang |
| 2005/0247963 A1 | 11/2005 | Chen |
| 2005/0274988 A1 | 12/2005 | Hong |
| 2005/0274996 A1 | 12/2005 | Iwawaki |
| 2006/0054946 A1 | 3/2006 | Baek |
| 2006/0124833 A1 | 6/2006 | Toda |
| 2006/0146230 A1 | 7/2006 | Joon |
| 2006/0146412 A1 | 7/2006 | Kim |
| 2006/0172451 A1 | 8/2006 | Park |
| 2006/0183265 A1 | 8/2006 | Oh |
| 2006/0231898 A1 | 10/2006 | Jeong |
| 2007/0010042 A1 | 1/2007 | Li |
| 2007/0012970 A1 | 1/2007 | Mouli |
| 2007/0018073 A1 | 1/2007 | Hsu |
| 2007/0023851 A1 | 2/2007 | Hartzell |
| 2007/0031988 A1 | 2/2007 | Agranov |
| 2007/0052050 A1 | 3/2007 | Dierickx |
| 2007/0072326 A1 | 3/2007 | Zheng |
| 2007/0096173 A1 | 5/2007 | Kim |
| 2007/0117253 A1 | 5/2007 | Hsu |
| 2007/0158772 A1 | 7/2007 | Boettiger |
| 2007/0166649 A1 | 7/2007 | Yu |
| 2007/0202696 A1 | 8/2007 | Inuiya |
| 2008/0036020 A1 | 2/2008 | Ko |
| 2008/0055733 A1 | 3/2008 | Lim |
| 2008/0079103 A1 | 4/2008 | Liao |
| 2008/0121805 A1 | 5/2008 | Tweet |
| 2008/0121951 A1 | 5/2008 | Kao |
| 2008/0157144 A1 | 7/2008 | Lee |
| 2008/0169546 A1 | 7/2008 | Kwon |
| 2008/0265348 A1 | 10/2008 | Maas |
| 2009/0066954 A1 | 3/2009 | Opsal |
| 2009/0121264 A1 | 5/2009 | Kao |
| 2009/0124037 A1 | 5/2009 | Yu |
| 2009/0127643 A1 | 5/2009 | Lu |
| 2009/0134484 A1 | 5/2009 | Lin |
| 2009/0168181 A1 | 7/2009 | Su |
| 2009/0200585 A1 | 8/2009 | Nozaki |
| 2009/0212335 A1 | 8/2009 | Kao |
| 2009/0256258 A1 | 10/2009 | Kreupl |
| 2009/0294888 A1 | 12/2009 | Tsai |
| 2009/0309230 A1 * | 12/2009 | Cui et al. .............. 257/773 |
| 2009/0321862 A1 | 12/2009 | Yu |
| 2010/0003623 A1 | 1/2010 | Liu |
| 2010/0038688 A1 | 2/2010 | Wu |
| 2010/0044813 A1 | 2/2010 | Wu |
| 2010/0096359 A1 | 4/2010 | Shiu |
| 2010/0144156 A1 | 6/2010 | Shih |
| 2010/0159632 A1 | 6/2010 | Rhodes |
| 2010/0315734 A1 | 12/2010 | Wu |
| 2011/0057277 A1 | 3/2011 | Yu |

* cited by examiner

METHOD FOR FABRICATING PATTERNED DICHROIC FILM

FIELD OF THE INVENTION

The present invention relates to a method for fabricating a semiconductor device, and more particularly to a method for fabricating a patterned dichroic film.

BACKGROUND OF THE INVENTION

Color filters are critical parts of a liquid crystal display (LCD) or an image sensor. Color filter arrays consisting of a plurality of R, B, G color filter elements are employed in combination with sensors to define color images or in combination with display devices to permit color images to be viewed.

A common approach for producing color filter arrays has been taught by using organic dyes embedded in a layer which has been patterned by various techniques to render the appropriate filter pattern. However, it is hard and time consuming to allow the organic dyes for altering the spectral characteristics. Furthermore, the organic dyes may be subject to fading with time especially under harsh environmental operating conditions, such as high light levels of ultra violet (UV), etc. Currently, dichroic films are thus adopted by the art to take the place of the traditional dyes.

Typically, the color filter arrays consisting of the patterned dichroic films may be fabricated by steps as follows: A patterned photo-resist layer is formed on a substrate; a dichroic film is then formed on the substrate and the patterned photo-resist layer by a film deposition process; and a lift off process is subsequently performed to strip off the patterned photo-resist layer, so as to define the appropriate filter pattern.

However, the dichroic films based color filter arrays still have some drawbacks, for example, photo-resist reflow may occur during the film deposition process due to the low glass transition temperature (Tg) of the photo-resist layer. Thus, it is unlikely to obtain a filter pattern having a clear, sharp and steep pattern profile after the reflowed photo-resist layer is stripped off. As a result, the yield of the color filter arrays could be adversely affected.

Therefore, there is a need of providing an advanced method for fabricating a patterned dichroic film to obviate the drawbacks and problems encountered from the prior art.

SUMMARY OF THE INVENTION

Therefore, one aspect of the present invention is to provide a method for fabricating a patterned dichroic film, wherein the method comprises steps as follows: Firstly, a patterned material layer comprising at least one inorganic layer is provided on a substrate. A film deposition process is then performed to form a dichroic film on the patterned material layer and the substrate, wherein a first portion of the dichroic film is disposed on and in contact with the substrate and a second portion of the dichroic film is disposed on and in contact with the patterned material layer. The patterned material layer is subsequently removed, whereby the second portion of the dichroic film disposed on the patterned material layer can be removed.

In one embodiment of the present invention, the patterned material layer has a thickness substantially greater than that of the dichroic film. In one embodiment of the present invention, the second portion of the dichroic film which is disposed on the patterned material layer is separated from the first portion of the dichroic film disposed on the substrate.

In one embodiment of the present invention, the formation of the patterned material layer comprises steps of forming an inorganic layer on the substrate; forming a mask layer on the inorganic layer; and then patterning the mask layer and the inorganic layer. In one embodiment of the present invention, the inorganic layer and the mask layer have a total thickness substantially greater than that of the dichroic film.

In one embodiment of the present invention, the method further comprises a step of performing an etch process in order to form an undercut in the inorganic layer before the film deposition process is carried out. In one embodiment of the present invention, the patterned inorganic layer and the second portion of the dichroic film disposed on the patterned material layer are respectively separated from the first portion of the dichroic film disposed on the substrate.

In one embodiment of the present invention, in the etching process the mask layer has an etching rate lower than that of the inorganic layer. In one embodiment of the present invention, the etching process is a phosphoric-acid ($H_3PO_4$)-based wet etching process.

In one embodiment of the present invention, the inorganic layer consists of silicon nitride (SiN), and the mask layer consists of silicon oxide ($SiO_2$).

In one embodiment of the present invention, the formation of the patterned material layer comprises steps of forming a carbon-rich layer on the substrate; forming a mask layer on the carbon-rich layer; and then pattering the mask layer and the carbon-rich layer.

In one embodiment of the present invention, the carbon-rich layer is an amorphous carbon film. In one embodiment of the present invention, the amorphous carbon film is an Advanced Patterning Film™ (APF™).

In one embodiment of the present invention, the steps for patterning the carbon-rich layer and the mask layer compromises steps of performing an etching process in order to pattern the mask layer and expose a portion of the carbon-rich layer, and removing the exposed portion of the carbon-rich layer by using oxygen plasma. In one embodiment of the present invention, an undercut may be formed in the remaining carbon-rich layer by the oxygen plasma during the steps for patterning the carbon-rich layer and the mask layer.

In accordance with aforementioned embodiments, a method for fabricating a patterned dichroic film is provided. Wherein a patterned material layer comprising at least one inorganic layer is adopted to take the place of the traditional photo-resist. A film deposition process is then performed to form a dichroic film on the patterned material layer. A lift off process is subsequently carried out to form a color filter arrays consisting of the patterned dichroic films. Since the patterned material layer utilized to take the place of the traditional is a thermal-resist layer, thus the drawbacks of photo resist reflow could not occur any more during the film deposition process, and a patterned dichroic film having a clear, sharp and steep pattern profile can be obtained. As a result, the yield of the color filter arrays can be also increased.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

A method for fabricating a patterned dichroic film is provided to form color filter arrays having a clear, sharp and steep pattern profile in order to improve the performance and the yield of the color filter arrays. The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
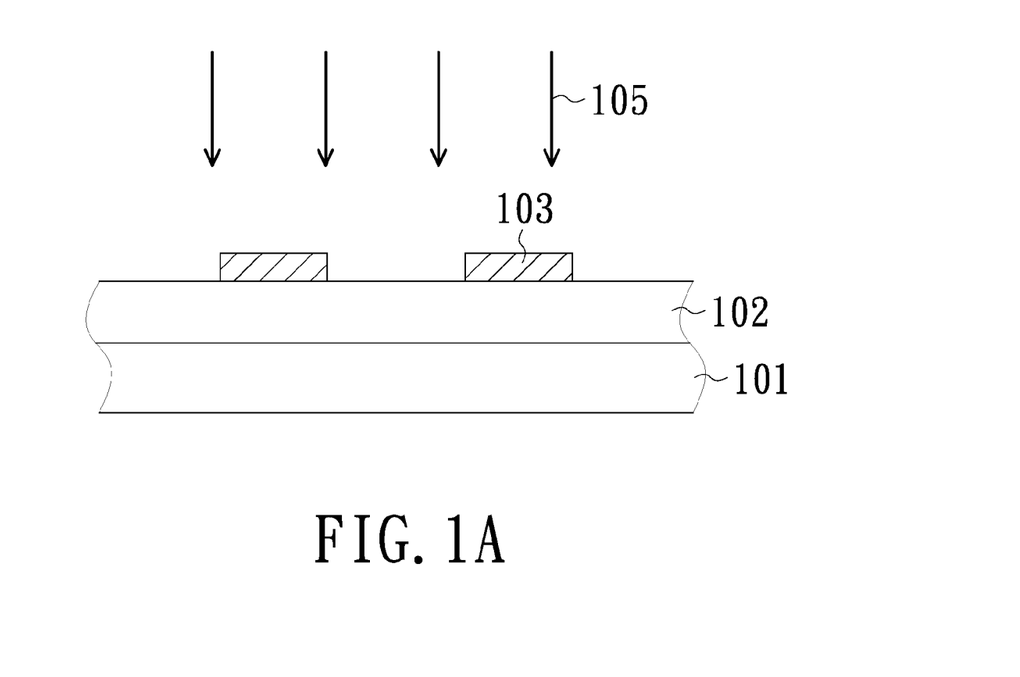
FIGS. 1A through 1D illustrate cross-sectional views of a method for fabricating a color filter array in accordance with one embodiment of the present invention.
Figure 1B:
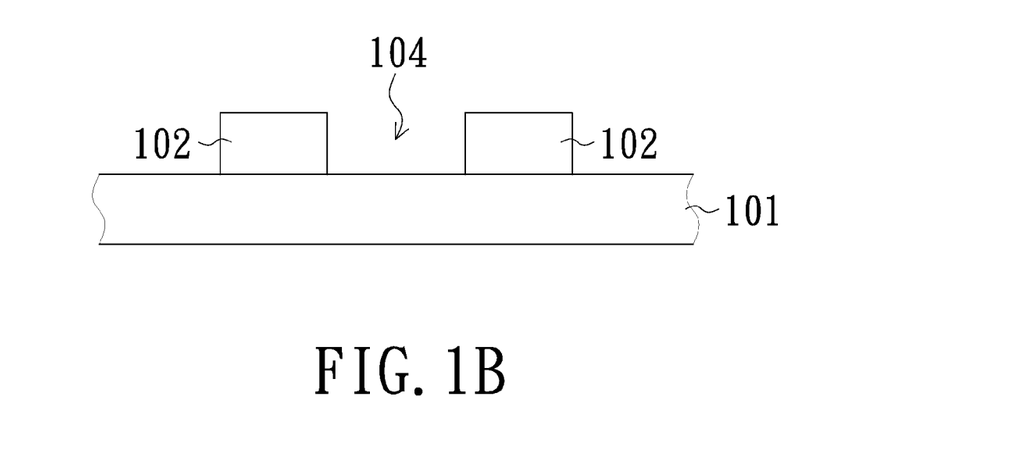

FIGS. 1A through 1D illustrate cross-sectional views of a method for fabricating a color filter array 100 in accordance with one embodiment of the present invention, wherein the method for fabricating a color filter array 100 comprises steps as follows:

An inorganic layer 102 is firstly formed on a substrate 101 (shown in FIG. 1A). The inorganic layer 102 may consist of SiN or $SiO_2$. In the present embodiment, the inorganic layer 102 preferably consists of SiN. Next, a lithography process 105 is then performed by using a photo-resist 103 as a mask to pattern the inorganic layer 102, whereby at least one opening 104 is formed in the inorganic layer 102, and a portion of the substrate 101 is exposed from the opening. In the present embodiment, a $H_3PO_4$-based wet etching process is performed on the inorganic layer 102, so as to form the patterned inorganic layer 102 having at least one of the opening 104 (shown in FIG. 1B). Alternatively, the patterned inorganic layer 102 may be formed by a dry etching process. For example, in some embodiments a reactive ion etching (RIE) process is adopted in order to pattern the inorganic layer 102, so as to form the patterned inorganic layer 102 having at least one of the opening 104.

Figure 1C:
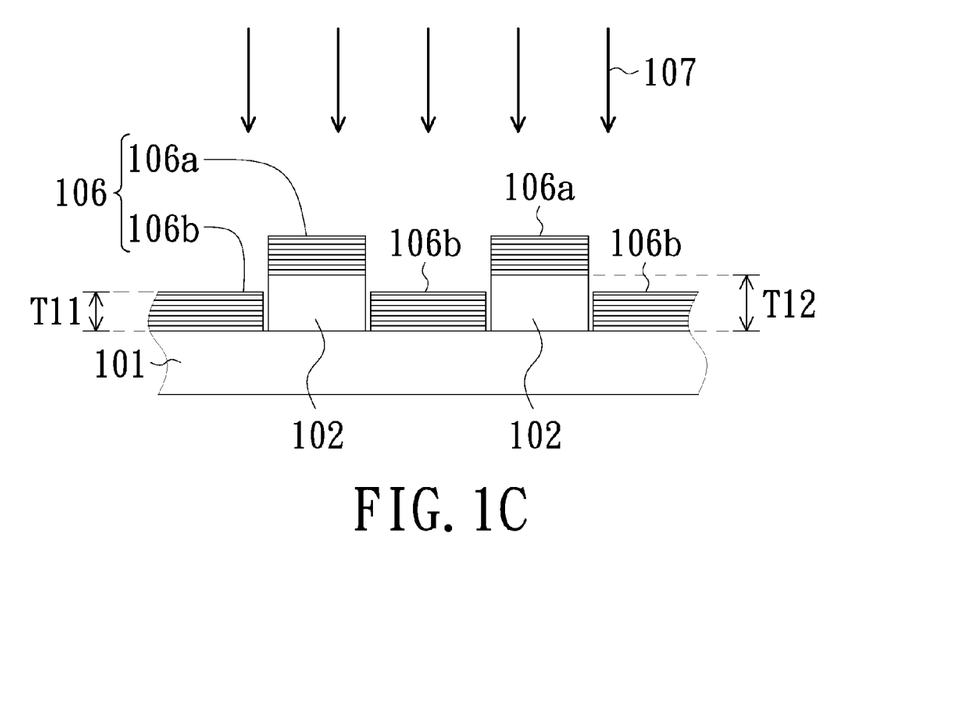

Subsequently, a film deposition process is performed on the patterned inorganic layer 102 and the exposed portion of the substrate 101 to form a dichroic film 106 fills the opening 104 (shown in FIG. 1C).

In some embodiments of the present invention, the dichroic film 106 is an interference filter constituted by at least two dielectric layers with different refractive indices, wherein the dichroic film 106 may be formed by physical vapor deposition (PVD), chemical vapor deposition (CVD), vacuum evaporation, electron beam evaporation (EBE) or other suitable film deposition processes. The dichroic film 106 has a multiple-layers structure which can be altered by controlling the air ambient of the film deposition processes. Various color lights may be provided by different dichroic films 106 with different structures.

Figure 1D:
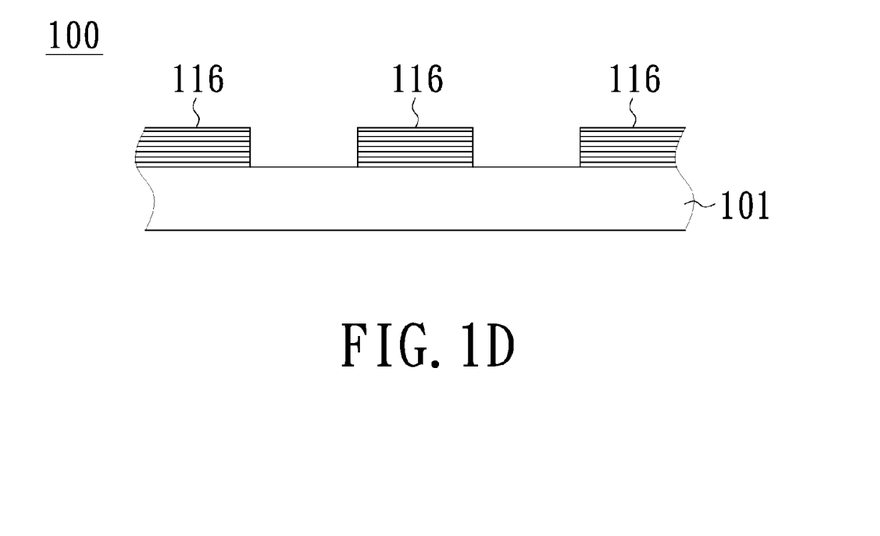

After the dichroic film 106 is formed, another etching process 107 is performed to remove the remaining inorganic layer 102. In some embodiment of the present invention, a $H_3PO_4$-based wet etching process is performed to remove the remaining inorganic layer 102 disposed on the substrate 101, thus the portion of the dichroic film 106 disposed on the remaining inorganic layer 102 can be removed simultaneously, while a patterned dichroic film 116, as shown in FIG. 1D, is formed.

In some embodiments of the present invention, the dichroic film 106 has a thickness T11 less than the thickness T12 of the inorganic layer 102, such that a step height or gap may occur between the portion of the dichroic film 106a deposited on the inorganic layer 102 and the portion of the dichroic film 106b deposited on the substrate 101. In other words, the portion of the dichroic film 106a which is disposed on the inorganic layer 102 cane be separated from the portion of the dichroic film 106b disposed on the substrate 101. Because the step height or gap allows the etchant of the etching process 107 in contact with the remaining inorganic layer 102 directly, as a result, the remaining inorganic layer 102 can be removed by the etching process 107 more easily.

The aforementioned steps may be subsequently repeated, so as to complete the formation of the color filter array 100.

FIGS. 2A through 2D illustrate cross-sectional views of a method for fabricating a color filter array 200 in accordance with one embodiment of the present invention, wherein the method for fabricating a color filter array 200 comprises steps as follows:

A material layer 202 is firstly formed on a substrate 201, wherein the material layer 202 comprises at least one inorganic layer 202a. In some embodiments of the present invention, the inorganic layer 202a preferably consists of SiN. In the present embodiment, the material layer 202 further comprises a mask layer 202b formed on the inorganic layer 202a, wherein the mask layer 202b has an etching rate different from that of the inorganic layer 202a. (shown in FIG. 2A). In some embodiments of the present invention, the mask layer 202b may be made of SiN or silicon oxide, and preferably is made of silicon oxide.

Next, a lithography process 205 is then performed by using a photo-resist 203 as a mask to pattern the material layer 202, whereby at least one opening 204 is formed in the material layer 202, and a portion of the substrate 201 is exposed from the opening 204. In the present embodiment, a hydrofluoric acid (HF)-based wet etching process or a dry etching process, such as a RIE, is performed to remove portions of the inorganic layer 202a and the mask layer 202b at the same time, so as to form the patterned material layer 202 having at least one of the opening 204 (shown in FIG. 2B).

Subsequently, another etching process 208 is performed to form undercuts 209 on the sidewalls of the inorganic layer 202a. In the present embodiment, the etching process 208 is a $H_3PO_4$-based wet etching process. Since during the etching process 208 the mask layer 202b ($SiO_2$) has an etching rate lower than that of the inorganic layer 202a (SiN), thus undercuts 209 may be formed on the sidewalls of the inorganic layer 202a and beneath the mask layer 202b (shown in FIG. 2C).

Figure 2A:
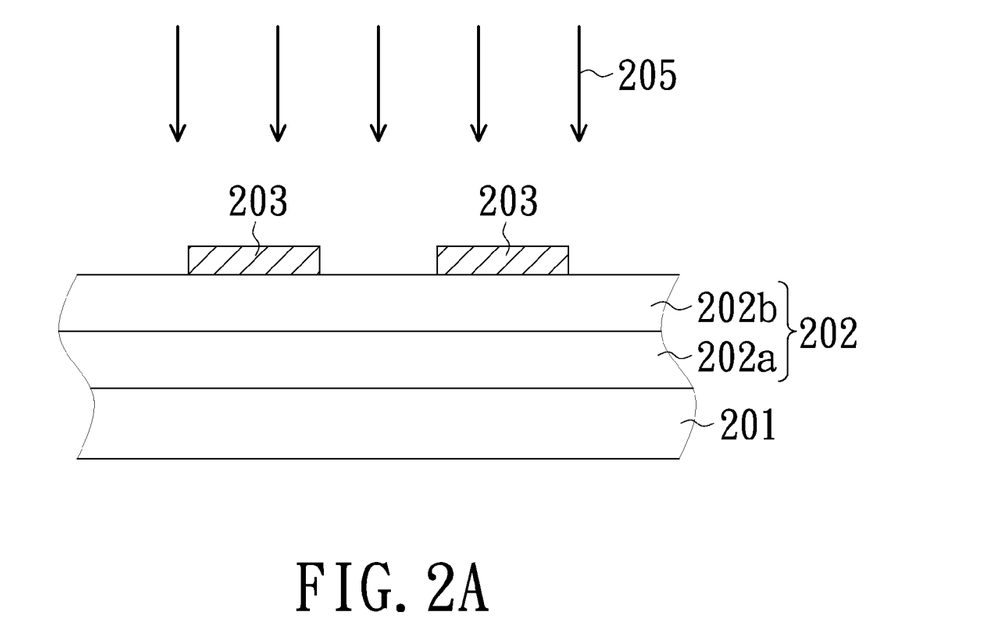
FIGS. 2A through 2E illustrate cross-sectional views of a method for fabricating a color filter array in accordance with another embodiment of the present invention.
Figure 2B:
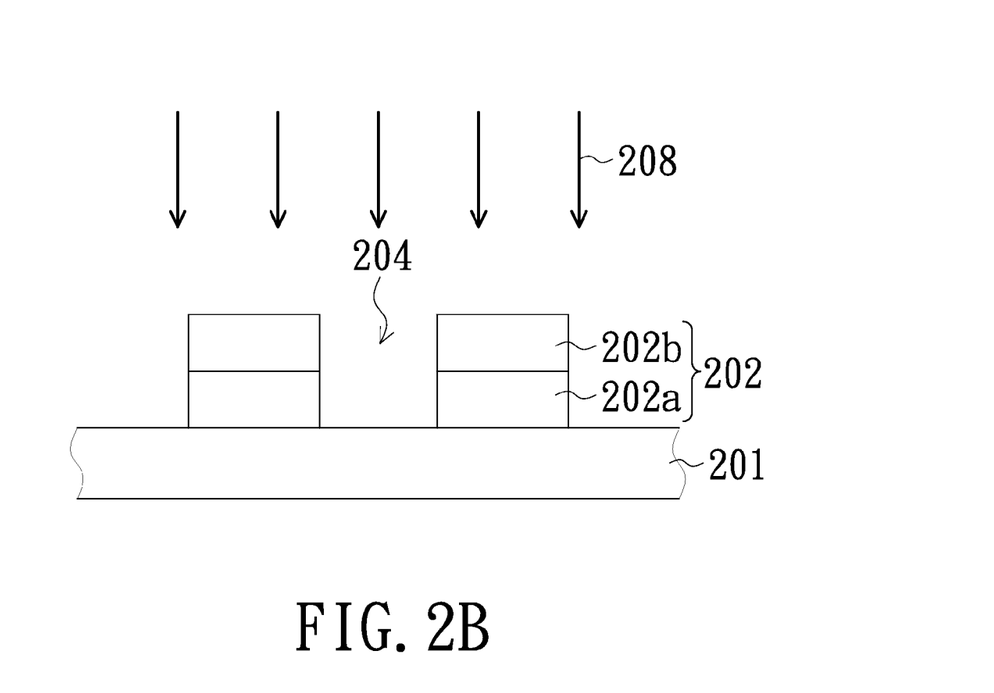
Figure 2C:
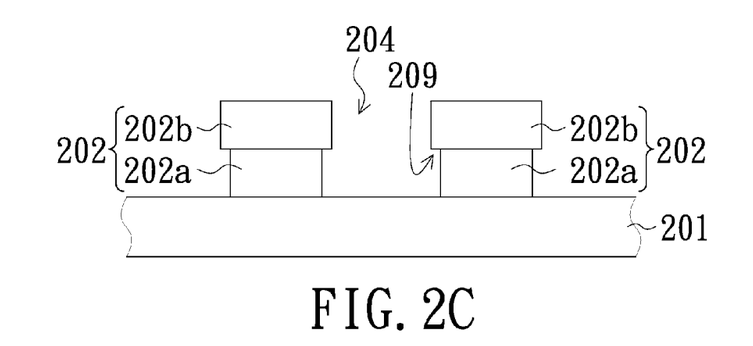

It should be appreciated that the arrangement of the inorganic layer (SiN) and the mask layer ($SiO_2$) depicted in the present embodiment is just for illustration. In some other embodiments, SiN may be formed on the $SiO_2$, as long as the underlying layer has an etching rate substantially higher than that of the upper layer during the etching process 208, so as to form an undercut.

Figure 2D:
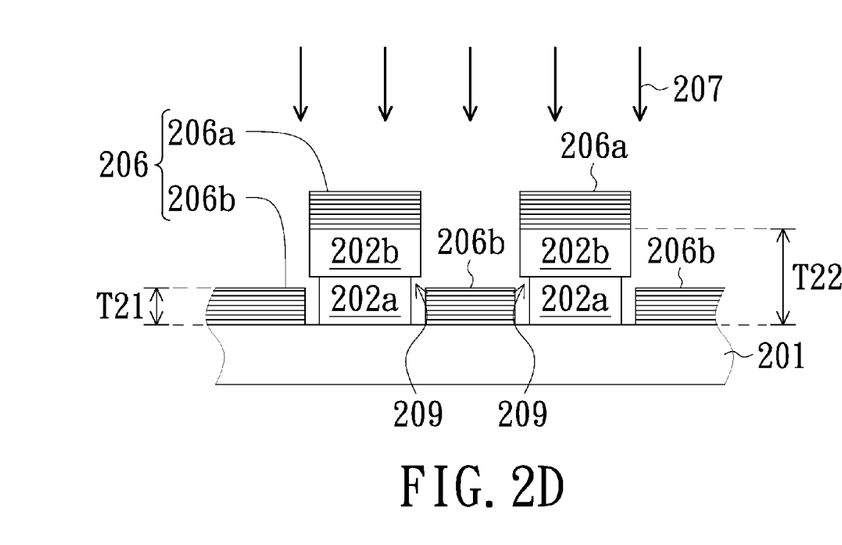

Then, a film deposition process is performed on the patterned material layer 202 and the exposed portion of the substrate 201 to form a dichroic film 206 fills the opening 204 (shown in FIG. 2D).

In some embodiments of the present invention, the dichroic film 206 is an interference filter constituted by at least two dielectric layers with different refractive indices, wherein the dichroic film 206 is formed by PVD, CVD, vacuum evaporation, EBE or other suitable film deposition processes. The dichroic film 206 has a multiple-layers structure which can be altered by controlling the air ambient of the film deposition processes. Various color lights may be provided by different dichroic films 206 with different structures.

Figure 2E:
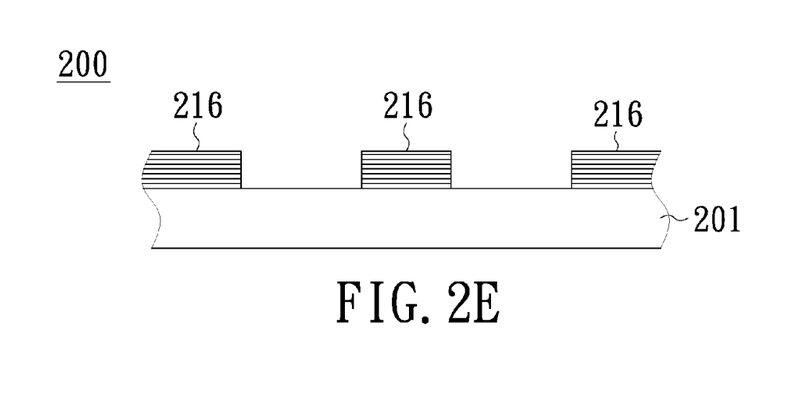

After the dichroic film 206 is formed, another etching process 207 is performed to remove the remaining inorganic layer 202a. In some embodiment of the present invention, a $H_3PO_4$-based wet etching process is performed to remove the remaining inorganic layer 202a disposed on the substrate 201, thus the portions of the mask layer 202b and the dichroic film 206 which are both disposed on the remaining inorganic layer 202a can be removed simultaneously, while a patterned dichroic film 216, as shown in FIG. 2E, is formed.

In some embodiments of the present invention, the dichroic film 206 has a thickness T21 less than the total thickness T22 of the inorganic layer 202a and the mask layer 202b, such that a step height or gap may occur between the portion of the dichroic film 206a deposited on the inorganic layer 202 and the portion of the dichroic film 206b deposited on the substrate 201. In other words, the portion of the dichroic film 206a which is disposed on the mask layer 202b can be separated from the portion of the dichroic film 206b disposed on the substrate 201. Besides, since there are undercuts 209 formed on the sidewalls of the inorganic layer 202a, thus the portion of the dichroic film 206b disposed on the substrate 201 can be kept away form the inorganic layer 202a. Because the step height (or gap) and undercuts 209 allow the etchant of the etching process 207 in contact with the remaining inorganic layer 202a directly, as a result, the remaining inorganic layer 202a can be removed by the etching process 207 more easily.

The aforementioned steps may be subsequently repeated, so as to complete the formation of the color filter array 200.

Figure 3A:
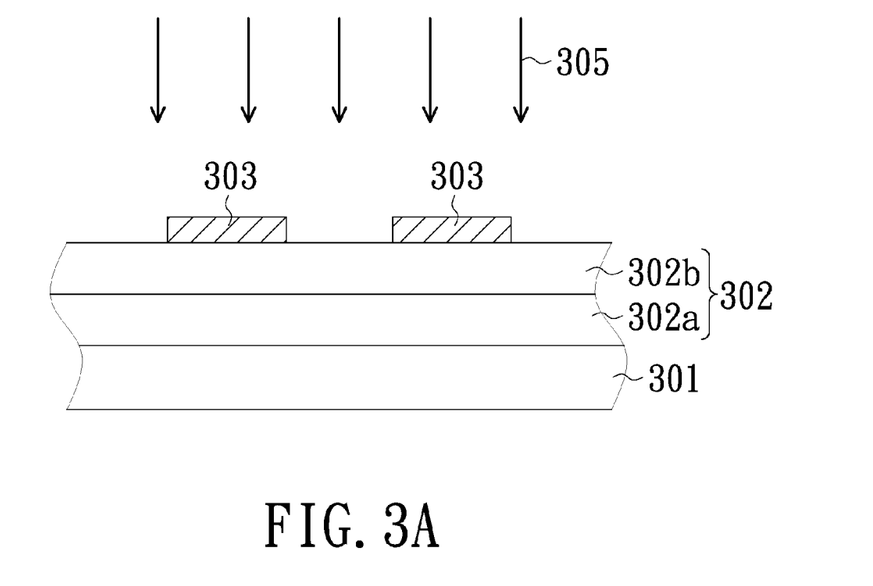
FIGS. 3A through 3E illustrate cross-sectional views of a method for fabricating a color filter array in accordance with one more embodiment of the present invention.

FIGS. 3A through 3E illustrate cross-sectional views of a method for fabricating a color filter array 300 in accordance with one embodiment of the present invention, wherein the method for fabricating a color filter array 300 comprises steps as follows:

A material layer 302 is firstly formed on a substrate 301, wherein the material layer 302 comprises at least one carbon-rich layer 302a. In some embodiments of the present invention, the carbon-rich layer 302a can be (but not limited as) an amorphous carbon film. In the present embodiment, the amorphous carbon film is an Advanced Patterning Film™ (APF™) provided by Applied Materials Inc. US.

In addition, the material layer 302 further comprises a mask layer 302b formed on the carbon-rich layer 302a (shown in FIG. 3A). In some embodiments of the present invention, the mask layer 302b may be made of SiN or silicon oxide, and preferably is made of silicon oxide.

Figure 3B:
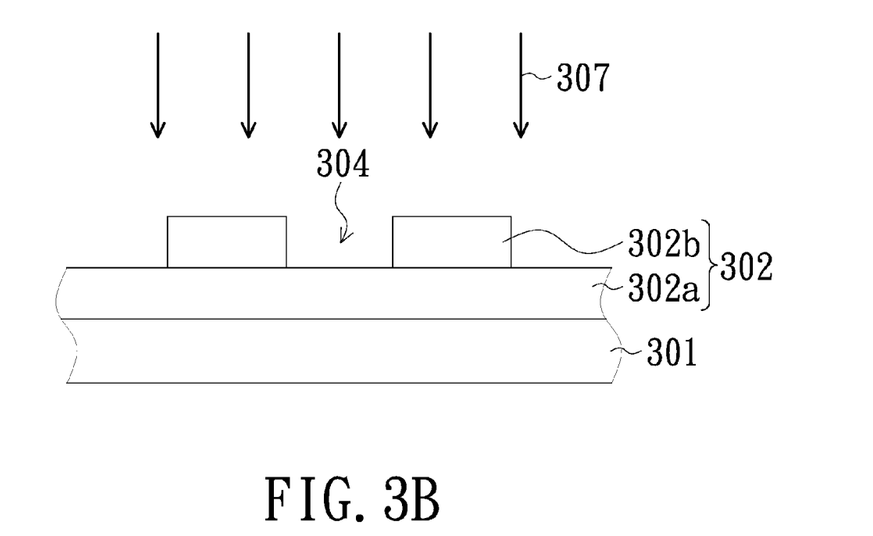
Figure 3C:
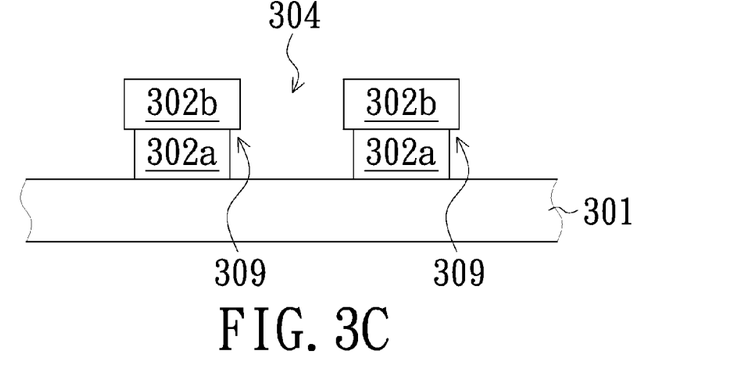

Next, the material layer 302 is patterned to form at least one opening 304 in the material layer 302, so as to allow a portion of the substrate 301 exposed from the opening 304. In the present embodiment, the process for patterning the material layer 302 comprises steps as follows:

A lithography process 305 is firstly performed by using a photo-resist 303 as a mask to pattern the mask layer 302b. For example, a HF-based wet etching process or a dry etching process, such as a RIE, is performed to remove portions of the mask layer 302b, so as to form at least one of the opening 304 allowing a portion of the carbon-rich layer 302a exposed there from (shown in FIG. 3B).

Subsequently, oxygen plasma 307 is introduced, whereby the exposed portion of the carbon-rich layer 302a is removed by plasma ashing. In the present embodiment, since the carbon-rich layer 302a is vulnerable to oxygen plasma 307, thus after the exposed portion of the carbon-rich layer 302a is removed, undercuts 309 may be formed on the sidewalls of the remaining carbon-rich layer 302a and beneath the mask layer 302b by the oxygen plasma (shown in FIG. 3C).

Figure 3D:
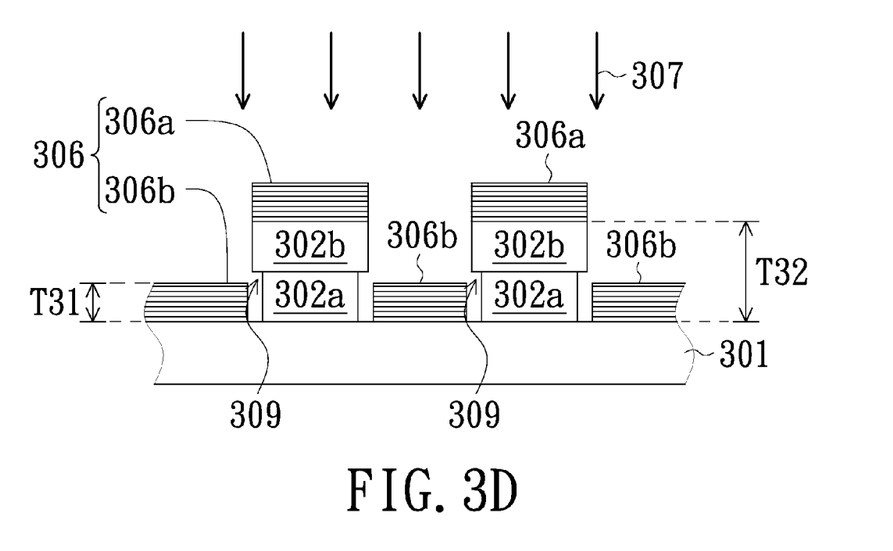

Next, a film deposition process is performed on the patterned material layer 302 and the exposed portion of the substrate 301 to form a dichroic film 306 fills the opening 304 (shown in FIG. 3D).

In some embodiments of the present invention, the dichroic film 306 is an interference filter constituted by at least two dielectric layers with different refractive indices, wherein the dichroic film 306 is formed by PVD, CVD, vacuum evaporation, EBE or other suitable film deposition processes. The dichroic film 306 has a multiple-layers structure which can be altered by controlling the air ambient of the film deposition processes. Various color lights may be provided by different dichroic films 306 with different structures.

Figure 3E:
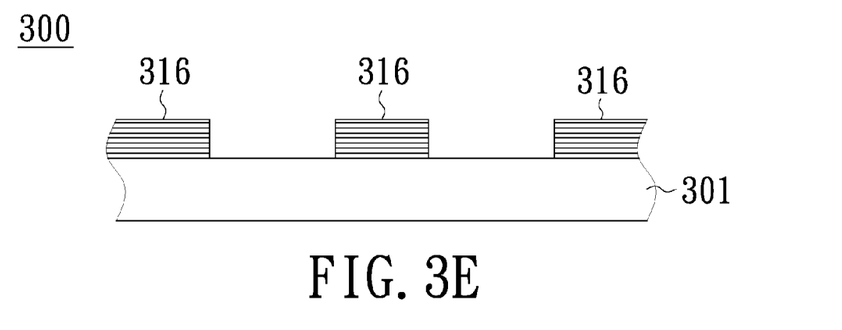

After the dichroic film 306 is formed, the remaining carbon-rich layer 302a and the portion of the dichroic film 306a disposed on the remaining inorganic layer 302a are removed. In the present embodiment, oxygen plasma 307 is introduced again to ash the remaining carbon-rich layer 302a, whereby the portions of the mask layer 302a and the dichroic film 306 which are both disposed on the remaining inorganic layer 302a can be removed simultaneously, while a patterned dichroic film 316, as shown in FIG. 3E, is formed. In some embodiment, after the oxygen plasma 307 is introduced, a wet cleaning process can be then carried out to further remove the ashed carbon-rich layer 302a.

In some embodiments of the present invention, the dichroic film 306 has a thickness T31 less than the total thickness T32 of the carbon-rich layer 302a and the mask layer 302b, such that a step height or gap may occur between the portion of the dichroic film 306a deposited on the inorganic layer 302 and the portion of the dichroic film 306b deposited on the substrate 301. In other words, the portion of the dichroic film 306a which is disposed on the mask layer 302b can be separated from the portion of the dichroic film 306b disposed on the substrate 301. Besides, since there are undercuts 309 formed on the sidewalls of the carbon-rich layer 302a, thus the portion of the dichroic film 306b disposed on the substrate 301 can be kept away form the carbon-rich layer 302a. Because the step height (or gap) and undercuts 309 allow the oxygen plasma 307 in contact with the remaining carbon-rich layer 302a directly, as a result, the remaining carbon-rich layer 302a can be removed by the oxygen plasma 307 more easily.

The aforementioned steps may be subsequently repeated, so as to complete the formation of the color filter array 300.

In accordance with aforementioned embodiments, a method for fabricating a patterned dichroic film is provided. Wherein a patterned material layer comprising at least one inorganic layer is adopted to take the place of the traditional photo-resist. A film deposition process is then performed to form a dichroic film on the patterned material layer. A lift off process is subsequently carried out to form a color filter arrays consisting of the patterned dichroic films. Since the patterned material layer utilized to take the place of the traditional is a thermal-resist layer, thus the drawbacks of photo resist reflow could not occur any more during the film deposition process, and a patterned dichroic film having a clear, sharp and steep pattern profile can be obtained. As a result, the yield of the color filter arrays can be also increased.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for fabricating a patterned dichroic film, comprising:
providing a patterned material layer on a substrate, wherein the patterned material layer comprises at least one inorganic layer;
performing a film deposition process to form a dichroic film on the patterned material layer and the substrate, wherein a first portion of the dichroic film is disposed on and in contact with the substrate and a second portion of the dichroic film is disposed on and in contact with the patterned material layer; and
removing the patterned material layer and the second portion of the dichroic film disposed on the patterned material layer.

2. The method according to claim 1, wherein the patterned material layer has a thickness substantially greater than that of the dichroic film.

3. The method according to claim 1, wherein the second portion of the dichroic film disposed on the patterned material layer is separated from the first portion of the dichroic film disposed on the substrate.

4. The method according to claim 1, wherein the formation of the patterned material layer comprises steps as follows:
forming an inorganic layer on the substrate;
forming a mask layer on the inorganic layer; and
patterning the mask layer and the inorganic layer.

5. The method according to claim 4, wherein the inorganic layer and the mask layer have a total thickness substantially greater than that of the dichroic film.

6. The method according to claim 4, further comprising a step of performing an etch process in order to form an undercut in the inorganic layer before the film deposition process is carried out.

7. The method according to claim 6, wherein the patterned inorganic layer and the second portion of the dichroic film disposed on the patterned material layer are respectively separated from the first portion of the dichroic film disposed on the substrate.

8. The method according to claim 6, wherein in the etching process the mask layer has an etching rate lower than that of the inorganic layer.

9. The method according to claim 8, wherein the etching process is a phosphoric-acid ($H_3PO_4$)-based wet etching process.

10. The method according to claim 4, wherein the inorganic layer consists of silicon nitride (SiN).

11. The method according to claim 4, wherein the mask layer consists of silicon oxide ($SiO_2$).

12. The method according to claim 1, wherein the formation of the patterned material layer comprises steps as follows:
forming a carbon-rich layer on the substrate;
forming a mask layer on the carbon-rich layer; and
patterning the mask layer and the carbon-rich layer.

13. The method according to claim 12, wherein the carbon-rich layer is an amorphous carbon film.

14. The method according to claim 12, wherein the steps for patterning the carbon-rich layer and the mask layer compromises steps as follows:
performing an etching process in order to pattern the mask layer and expose a portion of the carbon-rich layer; and
removing the exposed portion of the carbon-rich layer by using oxygen plasma.

15. The method according to claim 12, wherein an undercut is formed in the remaining carbon-rich layer by the oxygen plasma during the steps for patterning the carbon-rich layer and the mask layer.

* * * * *